United States Patent [19]

Bardl et al.

[11] Patent Number: 4,837,827

[45] Date of Patent: Jun. 6, 1989

[54] METHOD FOR TRANSMITTING TWO INDEPENDENT TYPES OF INFORMATION AND DEVICE FOR IMPLEMENTING THE METHOD

[75] Inventors: Artur Bardl, Munich; Manfred Lindner, Unterhaching, both of Fed. Rep. of Germany

[73] Assignee: Siemens Aktiengesellschaft, Berlin and Munich, Fed. Rep. of Germany

[21] Appl. No.: 747,113

[22] Filed: Jun. 20, 1985

[30] Foreign Application Priority Data

Jun. 29, 1984 [DE] Fed. Rep. of Germany ....... 3424037

[51] Int. Cl.[4] .......................... G06F 11/00; G10L 1/00
[52] U.S. Cl. ..................................... 381/34
[58] Field of Search ............ 381/34 MS; 370/77, 109

[56] References Cited

U.S. PATENT DOCUMENTS

| | | | |
|---|---|---|---|
| 3,860,760 | 1/1975 | Rittenbach | 179/15.55 T |
| 3,927,268 | 12/1975 | Sciulli et al. | 370/80 |
| 4,376,874 | 3/1983 | Karban et al. | 381/34 |
| 4,476,558 | 10/1984 | Arnon | 370/100 |
| 4,550,425 | 10/1985 | Anderson et al. | 381/30 |
| 4,587,669 | 5/1986 | Gillette | 381/32 |
| 4,631,746 | 12/1986 | Bergeron et al. | 381/35 |
| 4,675,863 | 6/1987 | Paneth et al. | 370/109 |
| 4,680,647 | 7/1987 | Moriyama | 360/19.1 |
| 4,688,224 | 8/1987 | Degan et al. | 381/46 |

FOREIGN PATENT DOCUMENTS 0013341 7/1980 European Pat. Off. .
0037071 3/1981 European Pat. Off. .

Primary Examiner—Manuel S. Kemeny
Assistant Examiner—Christopher H. Lynt
Attorney, Agent, or Firm—Herbert L. Lerner; Laurence A. Greenberg

[57] ABSTRACT

A method for transmitting two independent types of information over a transmission path having a transmitter side and a receiver side, a storage unit and a multiplexer device including sampling and time-compressing a first information type on the transmitter side by means of a fast clock for generating time gaps, and transmitting the first information type on the transmitting path, transmitting a second information type within the time gaps over the transmission path, the first and second information type is read on the receiver side and recovered by time expansion using a slow clock. The first signal is interim-stored on the receiver side under the control of the slow clock and by generation of the time gap, under control of the fast clock frequency. Shift frequencies are derived from the first and second clock frequencies, alternatingly addressing the storage unit through the multiplexer device with the shift frequencies, and deriving multiplexer signals from the fast and slow clock frequencies, and an apparatus for carrying out the method.

2 Claims, 7 Drawing Sheets

METHOD FOR TRANSMITTING TWO INDEPENDENT TYPES OF INFORMATION AND DEVICE FOR IMPLEMENTING THE METHOD

The invention relates to a method for transmitting two independent types of information and a device for implementing the method. While transmitting signals in one type of information (such as analog), it may be necessary to transmit independent accompanying signals in another type of information (such as digital). An example of such an application is represented by a radio transmission path in a telephone network. In such a network, the voice information proper is transmitted by the one (analog) type of information and the telemetering information is transmitted by the other (digital) type of information. Among the types of telemetering (or remote control) information are counter pulses, counter readings, alarms, remote control signals and the like.

Heretofore, such requirements could only be met by providing a separate transmission band for the analog signals on one hand, and by making a signalling band parallel thereto available for the digital signals on the other hand.

It is accordingly an object of the invention to provide a method for transmitting two independent types of information and device for implementing the method, which overcomes the hereinafore-mentioned disadvantages of the heretofore-known methods and devices of this general type, and to dispense with one transmission band.

With the foregoing and other objects in view there is provided, in accordance with the invention, a method for transmitting two independent types of information over a transmission path having a transmitter side and a receiver side, a storage unit and a multiplexer device, which comprises time companding a first signal of one information type on the transmitter side for generating a time gap, subsequently transmitting the first signal in a signal stream on the transmission path, transmitting a second signal of another information type in the time gap in the signal stream over the same transmission path, withdrawing or taking the second signal from the transmitted signal stream on the receiver side, recovering the first signal by time expansion, sampling and sectionwise uninterruptedly, cyclically, interim-storing the first signal on the transmitter side under the control of a first clock frequency, reading-out the first signal from the storage unit under the control of a second relatively faster clock frequency, interim-storing the first signal on the receiver side under the control of the second clock frequency and under the generation of the time gap, uninterruptedly reading-out the first signal under the control of the first clock frequency, deriving shift frequencies from the first and second clock frequencies, alternatingly addressing the storage unit through the multiplexer device with the shift frequencies, and deriving multiplexer control signals from the first and second clock frequencies.

The invention makes use of the principle of time compression and time expansion of one signal, such as the analog signal, at the beginning and at the end of the transmission path, respectively. In the case of time compression, the signal is brought section-wise to a slightly higher frequency position so that after each section a time gap remains, into which the other signals, such as the accompanying digital signals, are inserted. The mixture of the two types of signals is transmitted and at the end of the path, after the accompanying signals are removed, the individual sections are brought back from the somewhat higher frequency position to the original frequency position and are put together without a gap. In this manner, the same transmission path is used for both signals and both channels are subject to identical transmission conditions.

In order to implement the method, there is provided a device for transmitting two independent types of information, comprising a transmission path having a transmitter side and a receiver side, a memory unit on the transmitter side having a plurality of independently operable memory regions, a clock frequency supply for deriving or providing a first relatively slower and a second relatively faster shift frequency from clock frequencies, and a multiplexer device connected between the memory unit and the clock frequency supply for connecting the memory regions to the first shift frequency and subsequently to the second shift frequency within a cycle.

In accordance with another embodiment of the invention for implementing the method, there is provided a device for transmitting two independent types of information, comprising a transmission path having a transmitter side and a receiver side, a memory unit on the receiver side having a plurality of independently operable memory regions, a clock frequency supply for deriving or providing a first relatively faster and a second relatively slower shift frequency from clock frequencies, and a multiplexer device connected between the memory unit and the clock frequency supply for connecting the memory regions to the first shift frequency and subsequently to the second shift frequency within a cycle.

In accordance with a further feature of the invention, the memory regions of the memory unit are CCD channels. In accordance with a concomitant feature of the invention, the clock frequency supply is in the form of a first supply for providing or deriving the first shift frequency and a second supply for providing the second higher shift frequency.

Other features which are considered as characteristic for the invention are set forth in the appended claims.

Although the invention is illustrated and described herein as embodied in a method for transmitting two independent types of information and device for implementing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

According to the invention of the instant application, the time compression is accomplished by sampling an analog signal and subsequent storage with a clock frequency corresponding to the Nyquist theorem. The memory is read out with a slightly higher clock frequency so that a time gap for the accompanying signals in which there is no signal information is produced after the memory is read out.

Figure 1:
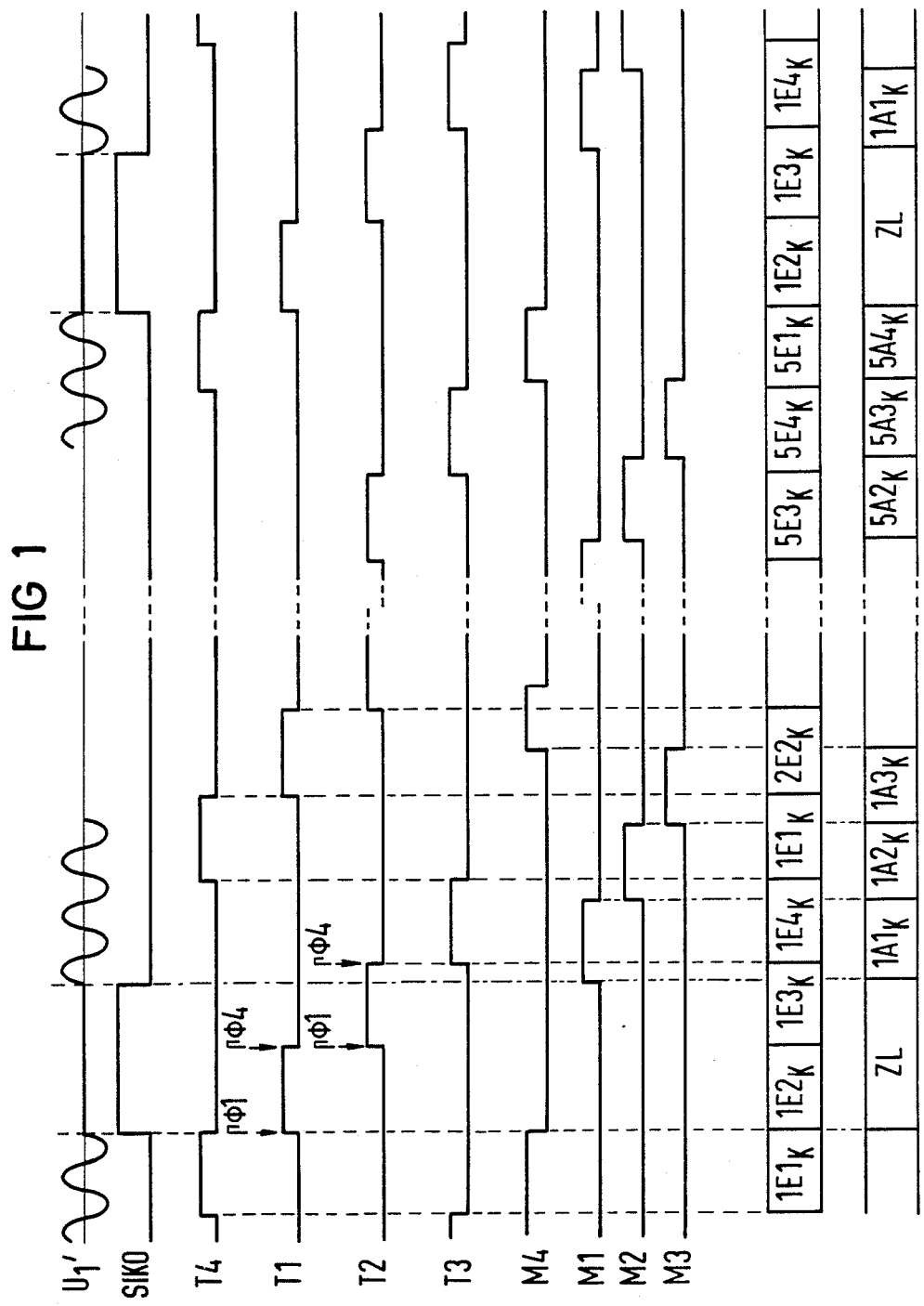
FIG. 1 is a graph of the waveform of a time-compression.

Referring now to the figures of the drawings in detail and first, particularly, to FIG. 1 thereof, there is seen a complete cycle, in which the required time gap ZL is derived and plotted versus the time axis. In order to store the sampled signal, four memories are used as in the circuit described below.

The following designations of the read-in and read-out times are used: the read-in processes are characterized by reference symbol E and the read-out processes by reference symbol A. The numeral following these letters indicates the number of the respective memory. The numeral preceding this combination indicates how many times this memory was accessed within the cycle. The subscripts E and K, respectively, (in FIGS. 1 and 2) refer to the expansion and compression, respectively. The designation $3 E 1_K$, for instance, indicates that the memory 1 was read-in during compression for the third time.

As the top line of the figures shows, the four memories are read-in sequentially in a given sequence. This process is repeated uninterruptedly five times within a cycle. It is assured in this manner that no information is lost when reading-in.

Reading-out, to which reference is made by the second line of the figure, is accomplished after a given time delay In the examples given, the first memory is read-in, while the third and fourth memories are simultaneously read-in This shift in time assures that the reading-in of a memory is not interrupted by the read-out process.

The memories are read-out sequentially without interruption in the same sequence Due to higher clock frequency during read-out, the respective times required for this purpose are shortened, so that the original delay between the reading-in and out of a memory is shortened with increasing repetition. At the end of the cycle, for instance, memory 4 is read-out again immediately after reading-in (see $5 E 4_K$ and $5 A 4_K$).

The first line of FIG. 1 shows an analog signal which is subject to time compansion. In the second line, the waveform of a synchronizing signal SIKO relating to the compansion is shown. The rising i.e., "edge" of the wave fixes the start of the read-in process and its falling edge fixes the start of the read-out process, so that its duration determines the length of the time gap $Z_L$. The lines below, each show read-in control pulses T1, T2, T3, T4 and the waveform of read-out control pulses M1 to M4, the significance of which will be explained in connection with the description of FIGS. 3 and 4.

Figure 2:
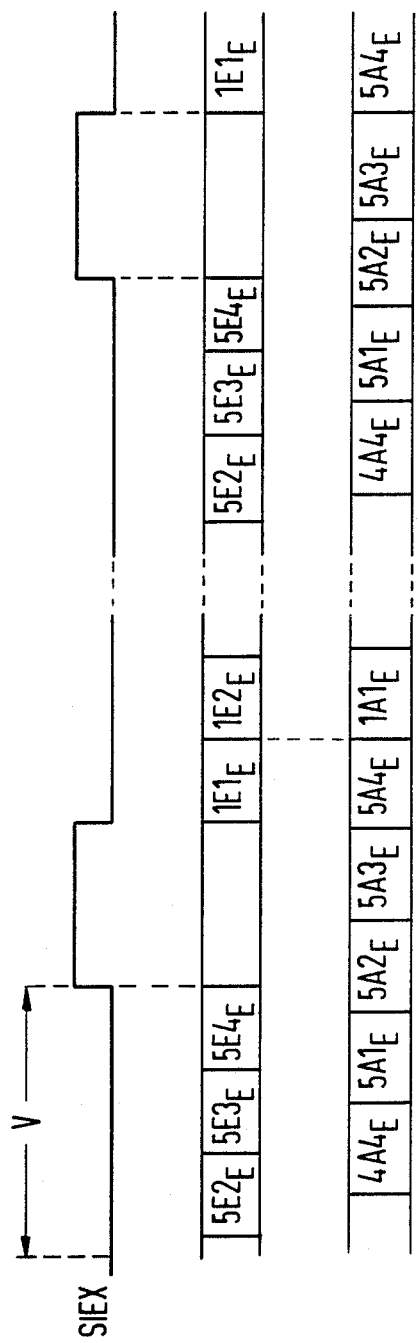
FIG. 2 is a graph of the waveform of a time expansion.

In FIG. 2, the schedule of the time expansion on the receiver side is shown. A further synchronizing signal SIEX in this case determines the length of the time gap on the receiver side. The read-in process for the memories is initiated since it is controlled by the falling edge of the signal. In the example shown, four memories are again used which are designated in agreement with FIG. 1. The compressed signal is sampled with a higher clock frequency corresponding to the transmitting frequency and is reading sequentially in a given sequence into the individual memories 1 to 4, without interruption during a cycle. In order to recover the original signal, these memories are then read-out with the slower clock frequency originally used for reading-in on the transmitter side, and are put together without a gap. The accompanying signal cuncurrently transmitted in the time gap is not stored. The time delay between the transmitter and the receiver side is caused by the signal propagation time on the transmission path. For reasons of clarity, the illustration of the control pulses is dispensed with in FIG. 2. However, the illustration thereof can be provided subsequently without difficulty by means of FIG. 1.

Figure 3:
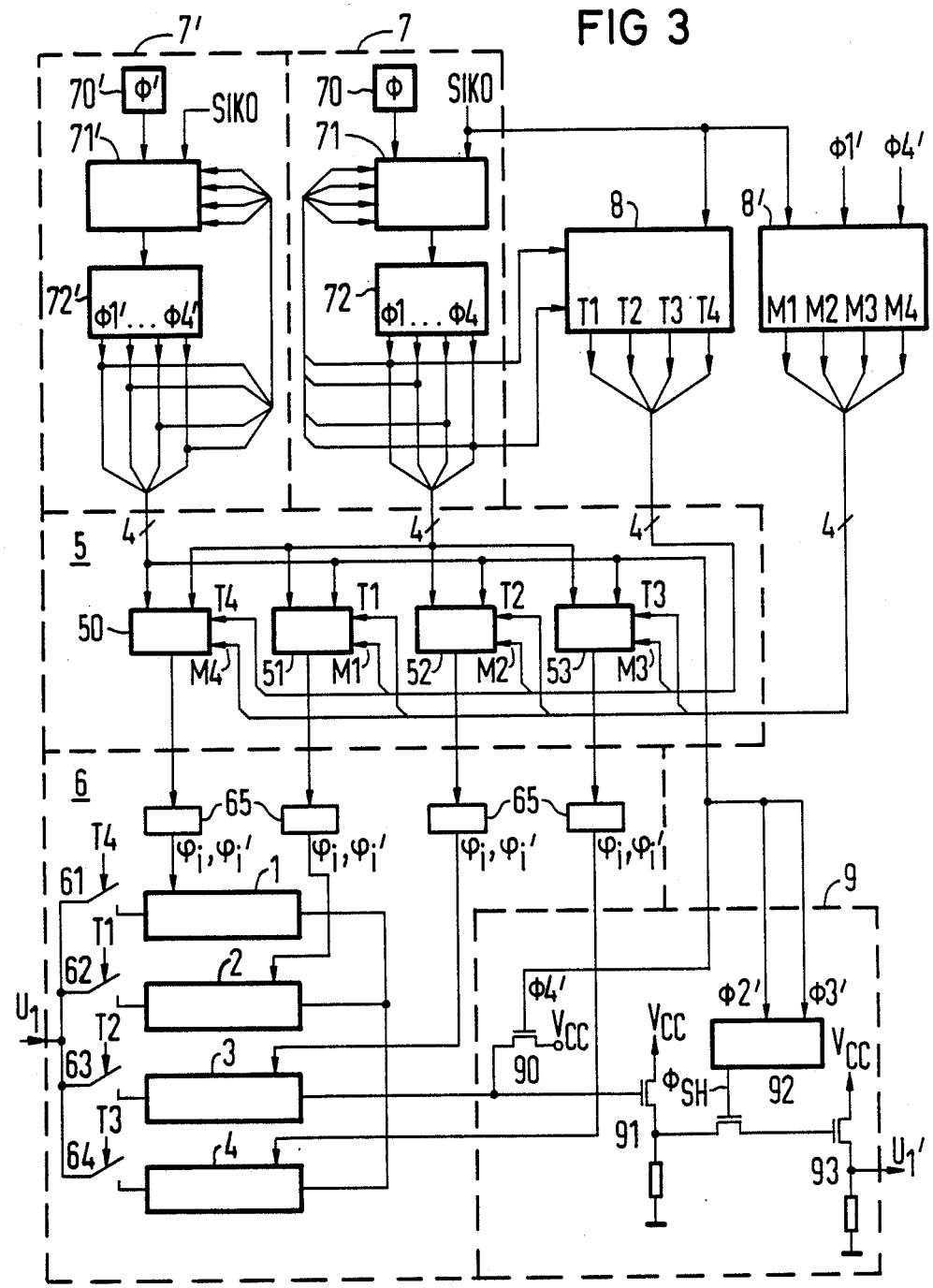
FIGS. 3 and 4 are block circuit diagrams of the device for implementing the compression and expansion, respectively.
Figure 4:
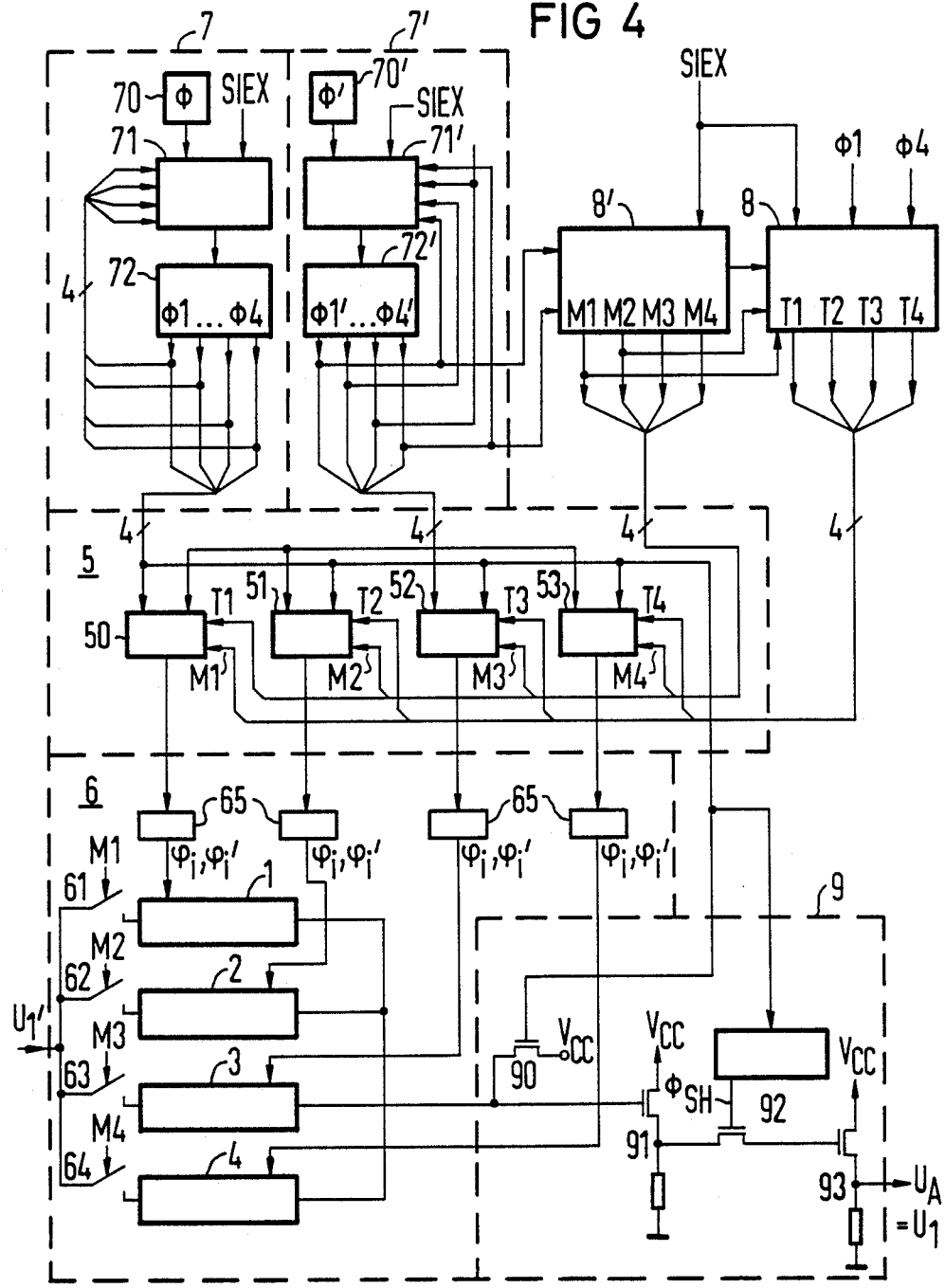

The apparatus shown in FIG. 3 serves to carry out the time compression described with regard to FIG. 1. The apparatus according to FIG. 4 is suitable for the time expansion described with reference to FIG. 2. The two apparatus are substantially identical and only the required pulses and control signals differ, in dependence on the mode of operation. Similar elements have been given the same reference symbols in both figures.

Each apparatus contains two clock frequency supplies 7, 7', a multiplexer device 5, a memory unit 6, a read-out circuit 9, as well as a first and a second multiplexer control 8, 8', respectively.

Figure 6:
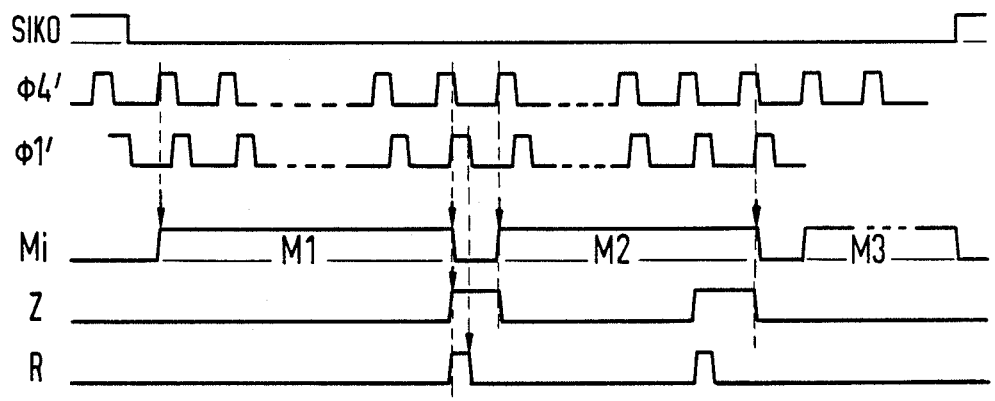
FIGS. 6, 8, 10 and 11 are graphs

The clock frequency supplies 7, 7' are each formed of a clock generator 70, 70' with a first (faster) and a second (slower) clock frequency $\phi$ and $\phi'$, respectively, and a phase control circuit which includes a synchronization unit 71, 71' and a divider 72, 72'. The outputs of the dividers are connected to four shift pulses $\phi1$ to $\phi4$ (or $\phi1'$ to $\phi4'$) which are required for operating the memory unit 6 and are derived from the clock frequency $\phi$ (or $\phi'$, respectively). As is shown in FIG. 6 through the use of the shift pulses $\phi1$ to $\phi4$ and the first pulse $\phi$, the phase control circuits serve for phasing-in the shift pulses and the corresponding synchronizing signals SIKO and SIEX. The clock frequency $\phi$ and therefore the derived shift pulses $\phi1$ to $\phi4$, are slower than the clock frequency $\phi'$ and tee shift pulses $\phi1'$ to $\phi4'$ derived therefrom. The first mentioned shift pulses serve for operating the memory unit 6 on the transmitting side during the read-in process and on the receiver side during the read-out process. Due to the last-mentioned shift process, the memory unit 6 is operated on the transmitting side during the read-out process, and on the receiver side during the read-in process The outputs of the two clock frequency supplies 7, 7'are connected to the data inputs of the multiplexer device 5 in such a way that, depending on the clock control signals, either the shift pulses $\phi1$ to $\phi4$ or the shift pulses $\phi1'$ to $\phi4'$ are connected through to the memory unit 6.

The multiplexer device 5 is formed of four parallel multiplexers 50, 51, 52, 53 which are always addressed alternatively by one of the controls 8' or 8, respectively.

Figure 5:
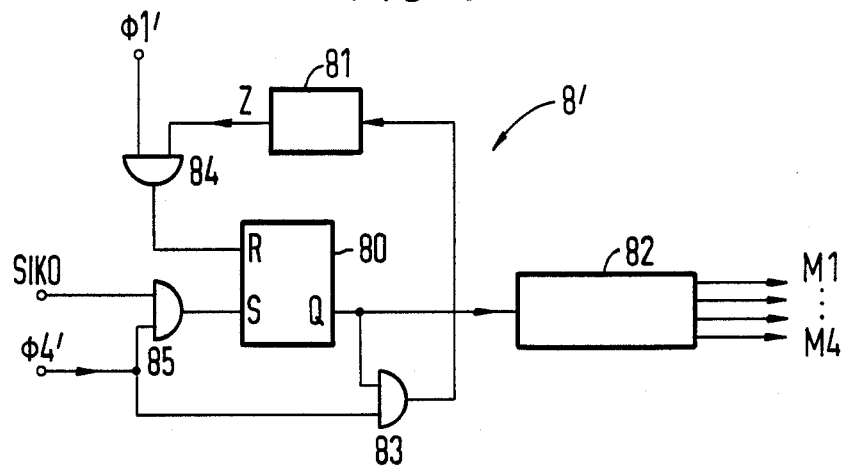
FIGS. 5 an 7 are schematic and block diagrams.

The read-in clock control signals T1 are derived by a divider in the clock generators 8, 8' from the clock signals $\phi$ and $\phi'$, respectively, and the shift pulses $\phi1$ and $\phi4$ or $\phi1'$ and $\phi4'$, respectively In the embodiment example, the edges of the clock control signals are synchronized with the lateral surfaces of the shift pulses. The duration is fixed to 12 pulses of the clock frequencies $\phi1$ to $\phi4$. In FIG. 5, an embodiment of the multiplexer control 8' is shown. The control 8' is formed of an RS flip-flop 80, a modulo-12 counter 81, a one-of-four decoder 82 and three AND gates 83, 84, 85. The counter 81, after counting 12 pulses of the clock signal $\phi 4'$, furnishes a short signal Z which resets a flip-flop output Q in the linkage with the shift frequency $\phi 1'$. From this output, the successive read-in clock control signals T1 are fed to the decoder 82. FIG. 6 shows the waveform of the input and output signals of the flip-flop 80 versus time, as well as of the waveforms of the entire circuit according to FIG. 5.

Figure 7:
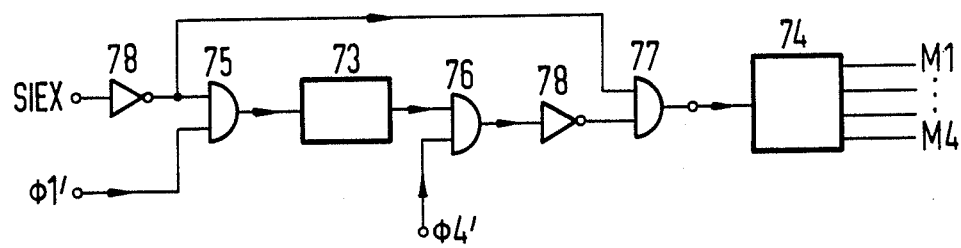
Figure 8:
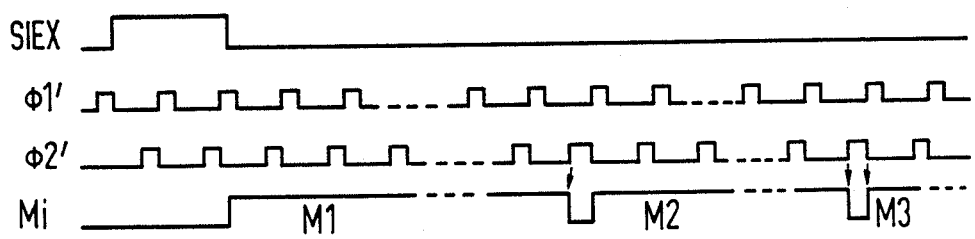

FIG. 7 shows an embodiment of the multiplexer control 8' for generating the selection pulse control signals M1 The control 8' includes two inverters 78, a modulo-12 counter 73, a one-of-four decoder 74 and three AND stages 75, 76, 77. The operation of the circuit can be seen from the pulse diagram of FIG. 8. The memory unit 6 contains switches 61–64. During reading, all of the switches 61 to 64 are open.

In the embodiment example, the memory unit 6 is formed of CCD (i.e. "charge-coupled device") elements with four parallel channels (memories 1, 2, 3, 4) in four-phase operation. Each channel is formed of series-connected storage cells which, as is known, are in turn formed of a row-like, close construction of four MOS capacitors, through which charge packets are transferred under the influence of four CCD clock voltages $\rho 1$ to $\rho 4$ and $\rho 1'$ to $\rho' 4'$, respectively. The signal charge is finally stored in a so-called potential sink under one of the capacitor electrodes.

Figure 9:
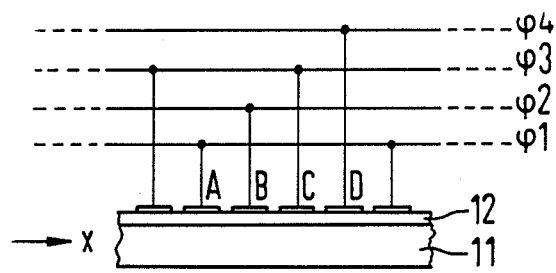
FIG. 9 is a fragmentary, diagrammatic, elevational view showing details of the graphs and diagrams of FIGS. 1–3.
Figure 10:
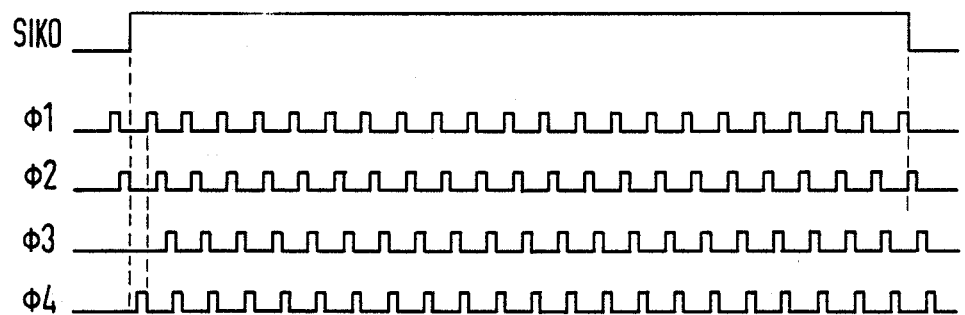
Figure 11:
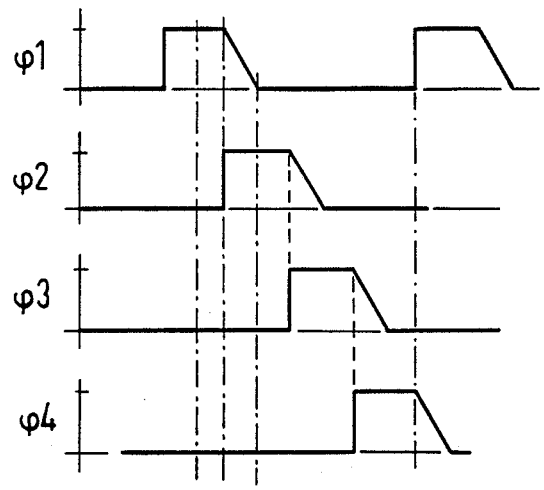

FIG. 9 shows a conventional CCD storage cell working in four-phase operation and being formed of a silicon substrate 11, an $SiO_2$ layer 12 and four MOS capacitor electrodes A, B, C, D. The charge transport direction is designated with an arrow X. The pulse diagram of FIG. 10 shows the manner in which the storage cells or the four channels 1, 2, 3, 4 are to be acted upon by CCD clock signals $\rho 1$ to $\rho 4$. As is well known, these signals are to overlap for this purpose as shown and have a gradually falling edge. This condition is met by providing appropriately wired drivers 65 ahead of the memories 1 to 4.

However, other types of shift registers can also be used for implementing the invention. It is essential for the feasibility of the invention that an input signal U1 is read-in on the transmitting side with the first shift pulse and is read-out with the faster shift frequency after a delay time. Similarly, on the receiver side, the read-in must be faster and read-out more slow.

The read-out circuit 9 following the memory unit is formed of a gate 90 which is controlled by the shift frequency $\phi 4'$ and prevents a return of the charge to the memory unit 6, a subsequent source follower 91, and a sample-and-hold device 92 connected between the output of the follower 91 and an output stage 93. The sample-and-hold device 92 is formed of a gate which is controlled by a clock frequency $\phi SH$ which is derived from the two shift frequencies $\phi 2$, $\phi 3$ and $\phi 2'$, $\phi 3'$, respectively.

The operation of the apparatus will be described below while referring to the figures. On the transmitting side, the reading-in process of the one signal U1, which in this case is analog, starts with the positive edge of the first synchronizing signal SIKO. Subsequently, the associated multiplexer 51 is addressed by the control pulses T1 in such a manner that the lower-frequency shift pulses $\phi 1'$ to $\phi 4'$ are connected to the CCD channel 2. At the same time, the switch 62 connected ahead of the memory 2 is closed in order to pass the signal U1. All other switches 61, 63, 64 connected ahead of the other memories 1, 3, 4 are not addressed, i.e., they are open. By addressing the shift pulses $\phi 1'$ to $\phi 4'$, the signal U1 is stored and is sampled in the CCD device and converted into signal charges. At the end of the shift frequency T1, the next shift pulse T2 begins, the switch 63 being closed in the just-described manner, and the other switches are opened. In this manner, all multiplexers 51 to 53 and all switches 61 to 64 are addressed successively and the signal U1 is stored in the memories 1 to 4 without interruption. The other accompanying signal U2, which in this case is digital, is transmitted on the transmission path, at the earliest at the start of the synchronizing signal SIKO. This transfer is terminated at the latest with the falling edge of the synchronizing signal SIKO. The signal SIKO triggers the start of the clock control signal M1. The signal M1 in turn controls the associated multiplexer 50, in such a manner that the higher-frequency shift pulses $\phi 1$ to $\phi 4$ are connected through to the memory 1. The charge/voltage-converted memory content travels into the sample-and-hold circuit 92 through the gate 90 and then can be taken off at the output stage 93. The output of the output stage 93 feeds the output signal U1' to the transmitter or the transmission path with the admixture of the accompanying signal U2. Until the rising edge of the synchronizing signal SIKO appears, all memories 1 to 4 are read-out cyclically in this manner.

Upon the occurrence of the rising lateral surface of the synchronizing signal SIEX on the receiver side, the accompanying analog signal U2 is taken from the received data stream. The read-analog process described in connection with FIG. 2 begins with the falling edges, but with the higher-frequency shift pulses $\phi 1'$ to $\phi 4'$ and the clock control signals M1 to M4. The read-out on the receiver side begins with the reading-out of this memory, immediately after the termination of the read-in process of the memory 1. This is accomplished by means of the addressing by the shift pulses $\phi 1$ to $\phi 4$ and the clock control signals T1 to T4. The output signal $U_A$ of the circuit is expanded in time relative to the transmitted signal U1'. Since the signal sections stored in the interim in the memory unit 6 are put together without gap, it corresponds to the original input signal U1 without change.

Figure 12:
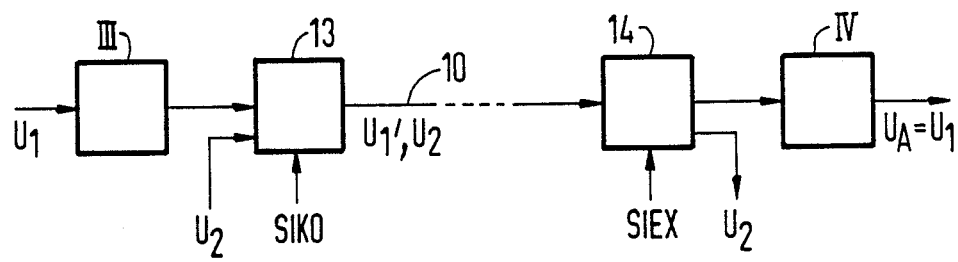
FIG. 12 is a block circuit diagram of a device for implementing the method.

FIG. 12 shows the complete transmission method. The first signal U1 in one type of information is first fed on the transmitter side to a compressor III (shown in FIG. 3) and then to a double-throw switch 13. The second input of the switch 13 is acted upon by a second signal U2 in the other type of information. The signal U1 and, in the time gap ZL the signal U2, are connected-through and transmitted to the receiver on a transmission path 10, as described above, while being controlled by the synchronizing signal SIKO.

There, the second signal U2 is taken off in the time gap ZL from the signal stream U1', U2 by a double throw switch 14 under the control of the synchronizing signal SIEX. Then, the first signal U1 which can be taken off as the output signal $U_A$ is recivered in an expander IV (shown in FIG. 4). The foregoing is s description corresponding in substance to German Application No. P 34 24 037.3, filed June 29, 1984, the International priority if which is being claimed for the instant application, and which is hereby made part of this application. Any material discrepancies between the foregoing specification and the aforementioned corresponding German application are to be resolved in favor of the latter.

We claim:

1. Method for transmitting a first and a second mutually independent type of information via a transmission path having a transmit and a receive side, comprising the steps of: sectionalizing and buffer-storing the first type of information on the transmit side in a transmit buffer store under control of a first clock sampling; time-compressing the first type of information by reading it out of the buffer store by means of a second clock, faster than the first clock, forming time gaps in the first type of information; transmitting the first and second type of information via the transmission path with the second type information in the time gaps; reading the first type of information on the receive side; buffer-storing the first type of information in a receive buffer store, having a first storage cell, under control of the second clock; recovering the first type of information without time gaps by reading it out from the receive buffer store under control of the first clock; including the further steps of: performing the buffer-storing on the respective transmit and receive side in at least four parallel channels by means of at least four respective shifting clocks, addressing the at least four channels alternatingly via a multiplexer with an equal number of shift-frequency clocks, respectively derived from the first and second clock, and controlling the channels with an equal number of multiplexer control signals, also respectively derived from the first and second clock; wherein both the transmit and receive side has a synchronizing signal having a duration equal to the duration of the time gap and having a leading a trailing edge, including the steps of: beginning the reading-in of the buffer store on the transmit side under control of the leading edge, terminating the reading-out of the buffer store on the receive side under control of the trailing edge; beginning the reading-in of the buffer store on the transmit side under control of the leading edge; and beginning the reading-in of the buffer store on the receive side under control of the trailing edge; and beginning the reading-out of the buffer store on the receive side immediately following the end of the reading-in of the first storage cell.

2. Apparatus for transmitting two mutually independent types of information on a transmission path having a transmit and a receive side, comprising: a transmit buffer store; a first clock source for writing-in the first type of information into the transmit buffer store; a second clock source faster than the first clock source connected to the transmit buffer store for reading out the first type of information from the transmit buffer store for time-compressing the first type information and leaving time gaps therein; transmitting the time-compressed first type of information on the transmission path, transmitting the second type information on the transmission path in the time gaps; the transmit buffer store including at least four independently operating, parallel charge-coupled memories, said first clock frequency source being controlled by a first synchronizing signal; a multiplexer driven by said first clock frequency source, cyclically addressing each of said charge-coupled memories within a transmission cycle first with a respective first shift frequency and subsequently with a second shift frequency faster than said first shift frequency; a receive buffer store having at least four further independently operating parallel charge-coupled memories, another clock frequency source controlled by a second synchronizing signal; and another multiplexer driven by said other clock frequency source, cyclically addressing each of said further charge-coupled memories within a transmission cycle, first with said second shift frequency, and subsequently with said first shift frequency; said first shift frequency being derived from said first clock frequency source and said second faster shift frequency being derived from said other clock frequency source.

* * * * *